(12) United States Patent
Broadhurst

(10) Patent No.: US 6,705,532 B2
(45) Date of Patent: Mar. 16, 2004

(54) SIGNAL SEQUENCING CONTROL MEANS

(75) Inventor: Denzil Broadhurst, Oldham (GB)

(73) Assignee: Pace Micro Technology Plc, Shipley (GB)

( * ) Notice: Subject to any disclaimer, the term of this patent is extended or adjusted under 35 U.S.C. 154(b) by 181 days.

(21) Appl. No.: 10/037,571

(22) Filed: Nov. 9, 2001

(65) Prior Publication Data

US 2002/0056757 A1 May 16, 2002

(30) Foreign Application Priority Data

Nov. 15, 2000 (GB) .............................................. 0027810

(51) Int. Cl.⁷ ................................................ G06K 5/00
(52) U.S. Cl. ...................................... 235/492; 235/380
(58) Field of Search ................................ 235/492, 380, 235/375, 449, 382; 340/641

(56) References Cited

U.S. PATENT DOCUMENTS

| | | | | |
|---|---|---|---|---|
| 5,092,799 A | * | 3/1992 | Kimura ........................ | 439/60 |
| 5,500,640 A | * | 3/1996 | Zhou et al. .................. | 335/284 |
| 5,589,719 A | * | 12/1996 | Fiset ........................... | 307/131 |
| 5,850,358 A | * | 12/1998 | Danielson et al. .......... | 713/321 |
| 5,971,282 A | * | 10/1999 | Rollender et al. .......... | 235/492 |
| 6,134,130 A | * | 10/2000 | Connell et al. ............... | 363/89 |
| 6,173,899 B1 | * | 1/2001 | Rozin .......................... | 235/492 |
| 6,283,367 B1 | * | 9/2001 | Matthew et al. ............ | 235/380 |
| 6,340,116 B1 | * | 1/2002 | Cecil et al. .................. | 235/492 |
| 6,424,203 B1 | * | 7/2002 | Bayadroun .................. | 327/536 |
| 6,431,441 B1 | * | 8/2002 | Franchi ....................... | 235/380 |
| 6,520,416 B1 | * | 2/2003 | Velsen et al. ................ | 235/492 |
| 6,578,768 B1 | * | 6/2003 | Binder et al. ............... | 235/492 |

* cited by examiner

*Primary Examiner*—Karl D. Frech
*Assistant Examiner*—Allyson Sanders
(74) *Attorney, Agent, or Firm*—Head, Johnson & Kachigian

(57) ABSTRACT

A signal sequencing control means is provided for an electronic device. The sequencing control means includes an electronic circuit (2) and timing means, to allow a sequence of control signals to be activated in a pre-determined order for operation of the device and deactivated in a reverse order for disabling the device. The electronic circuit is driven to generate the sequence of control signals in a forward and reverse direction along the same circuit path. The electronic circuit can be a smart card.

12 Claims, 1 Drawing Sheet

SIGNAL SEQUENCING CONTROL MEANS

CROSS-REFERENCE TO RELATED APPLICATION

This application claims priority to British Patent Application 0027810.1 filed Nov. 15, 2000.

BACKGROUND OF THE INVENTION

This invention relates to signal sequencing control means.

Although the following description refers almost exclusively to the use of signal sequencing control means for a smart card, it will be appreciated by persons skilled in that art that the present invention can be used for the control of any signal sequence which needs to be reversed between switching signals on and switching signals off.

Smart card is the common name given to a card, typically of credit card dimensions, containing a microchip and which is used in a variety of applications including securing internet transactions, credit card use, enabling financial transactions, application of ticketing and reward schemes, set top boxes to allow customers to receive and decrypt broadcast signals, for pay-to view channels and/or the like. Smart cards are deemed to be enabled when read in a correct manner by a smart card reader and this requires the sequence of control signals to be enabled in a first order on 'power-up' of the smart card. When use is completed, the sequence of control signals needs to be disabled in a reverse order on 'power-down' of the smart card.

Conventionally the forward and reverse sequences of a smart card are provided by a standard integrated electronic circuit in which includes digital timing means to allow the signals in a particular direction to be activated/deactivated at spaced time intervals. In addition, the electronic circuit is provided with two separate paths to drive the power up and power down signals respectively.

Since smart cards and other electronic devices are becoming increasingly used for both business, leisure and personal pursuits, there is a requirement to make the technology as inexpensive as possible.

An aim of the present invention is to provide a signal sequencing control means which provides an inexpensive and simple solution to activation and deactivation of a sequence of signals.

SUMMARY OF THE INVENTION

According to a first aspect of the present invention there is provided a signal sequencing control means for an electronic device, said sequencing control means including an electronic circuit and timing means, to allow a sequence of control signals to be activated in a pre-determined order for operation of the device and deactivated in a reverse order for disabling the device characterised in that the electronic circuit is driven to generate the sequence of control signals in a forward and reverse direction along the same circuit path.

Preferably each control signal is controlled by a resistor/capacitor combination and the signals are controlled by a network of said resistor/capacitor combinations to allow the signals to be activated/deactivated in sequence at pre-determined time intervals.

Preferably the number of resistor/capacitor combinations corresponds to the number of signals to be activated/deactivated in the sequence.

Preferably the resistors of the network are provided in series.

Preferably the sequence of control signals are operated via a number of logic gates.

Further preferably the logic gates are Schmidt Logic Gates.

In one embodiment a logic gate drives voltage through the resistors in a first direction via a diode at the start of the resistor path. A reverse diode is typically provided at the end of the resistor path to drive voltage through the resistors in the reverse direction.

In one embodiment the sequence of the signals in a forwards direction may be different to the sequence of signals in the reverse direction, yet still be driven using the same circuit path.

In one embodiment the electronic device is a smart card and the sequencing control means is provided on/in a smart card reader. The smart card reader typically contains four lines leading to the smart card which need to be enabled in a correct sequence for the smart card to operate. The four lines allow the supply of voltage to the card, place the bi-directional data line of the card in receive mode, apply the clock, and finally enable the reset signal.

According to a second aspect of the present invention there is provided a signal sequencing control means for a smart card interface, said interface including an electronic circuit and timing means to allow a sequence of control signals to be activated in a pre-determined order for operation of the card and deactivated in a reverse order for disabling the card and characterised in that the electronic circuit is driven to generate the sequence of control signals in a forwards and reverse direction along the same circuit path.

According to a further aspect of the present invention there is provided a smart card reading apparatus, said apparatus for reading/receiving and processing signals for a smart card, said reading apparatus having an electronic circuit and wherein the reading apparatus includes timing means to allow a sequence of control signals to be activated in a pre-determined order for operation of the smart card and deactivated in a reverse order for disabling the smart card and characterised in that the electronic circuit is driven to generate the sequence of control signals in a forwards and reverse direction along the same circuit path.

Preferably the smart card reader is built into a broadcast data receiver. The broadcast data receiver typically forms part of a television system and receives and processes data in the form of video, audio and/or auxiliary data broadcast from a remote location by cable, satellite or terrestrial means.

An advantage of the present invention is that the signal sequencing control means uses a single circuit to drive the sequence of signals in the smart card in both a forwards and reverse direction Thus fewer components are required for the signal sequence and the electronic circuitry is therefore inexpensive. This is in contrast to conventional signal sequence control means in reading apparatus in which two separate paths and, as a result different sets of components, are required to drive a sequence of signals in a forward and reverse direction respectively. Conventional circuitry is more expensive than the present invention as more components are required.

BRIEF DESCRIPTION OF THE DRAWINGS

An embodiment of the present invention will now be described with reference to the accompanying figure wherein.

DESCRIPTION OF THE PREFERRED EMBODIMENTS

Figure 1:
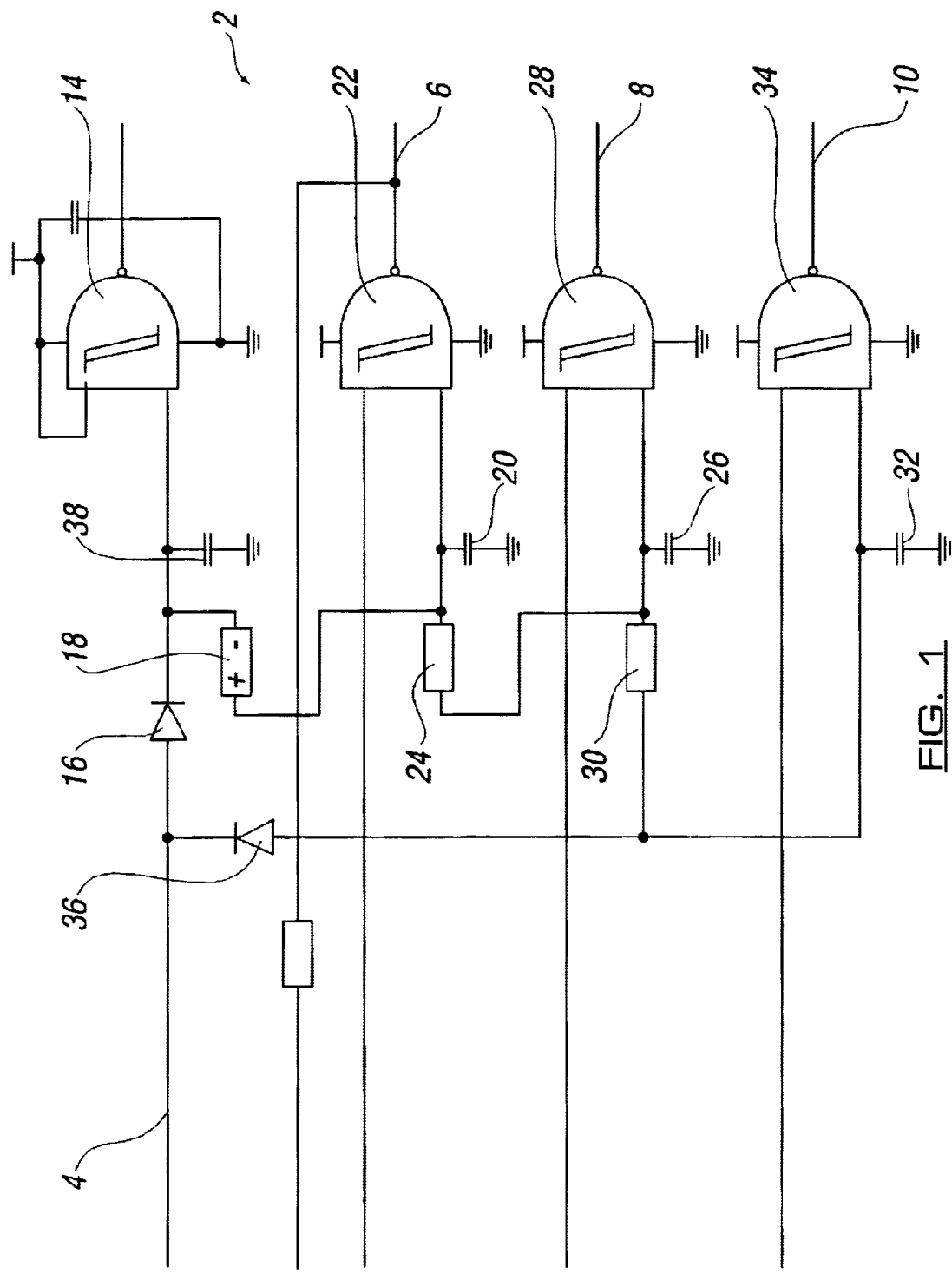
FIG. 1 is a circuit diagram according to the present invention.

Referring to FIG. 1, there is illustrated a circuit 2 comprising a first control line 4 and three further lines 6, 8, 10. When the voltage in control line 4 moves from a low condition to a high condition, a timed sequence of signals is initiated in the further lines 6, 8, 10 to enable the circuit.

Firstly, the first logic gate 14 has an output defined by control line 4 and is enabled via diode 16. The combination of resistor 18 and capacitor 20 provides a time delay before the second logic gate 22 of the sequence is enabled. The combination of resistor 24 and capacitor 26 provides a time delay before the third logic gate 28 of the sequence is enabled. Finally the combination of resistor 30 and capacitor 32 provides a time delay before the fourth logic gate 34 of the sequence is enabled.

Line 4 is the output from gate 14 which then controls an electronic switch which provides the power to the smart card. Lines 6, 8 and 10 drive the smart card.

When the voltage in control line 4 moves from a high condition to a low condition, the timed sequence is reversed and the circuit is disabled. This is a result of voltage passing through diode 36, which disables the fourth gate 34. The combination of resistor 30 and capacitor 26 then disable the third gate 28 after a timed delay. The combination of resistor 24 and capacitor 20 then disable the second gate 22 after a timed delay and finally the combination of resistor 18 and capacitor 38 then disable the first gate 14 after a timed delay.

The circuit described above can be used as part of a smart card interface between a smart card and a smart card reader, the circuit being provided on the reader. A smart card typically contains four lines which need to be enabled in a correct sequence for the smart card to operate. The four lines allow the supply of voltage to the card, place the bi-directional data line of the card in receive mode, apply the clock, and finally enable the reset signal. To safely disable the card after use, the reset signal must be moved from a high condition to a low condition, the clock then needs to be stopped, the data line needs to be moved from a high condition to a low condition and then finally the voltage supply to the smart card is removed.

The logic gates 14, 22, 28 and 34 are typically Schmidt gates.

Thus it can be seen that the above system can be used in a number of different electronic devices in which a sequence of control signals needs to be enabled in a first order and disabled in a reverse order.

Although the illustrated circuit shows only 4 lines, it will be appreciated by persons skilled in the art that the circuit can be adapted to include different numbers of lines by increasing or reducing the number of combinations of capacitors and resistors.

While the invention has been described with a certain degree of particularly, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. A signal sequencing control means for an electronic device, said sequencing control means comprising:
    an electronic circuit driven to generate the sequence of control signals in a forward and reverse direction along a same circuit path; and
    timing means to allow a sequence of control signals to be activated in a pre-determined order for operation of the device and deactivated in a reverse order for disabling the device.

2. A signal sequencing control means according to claim 1 wherein each signal is controlled by a resistor/capacitor combination.

3. A signal sequencing control means according to claim 2 wherein the control signals are controlled by a network of said resistor/capacitor combinations and the network provides the activation/deactivation of the signals in sequence at pre-determined time intervals.

4. A signal sequencing control means according to claim 3 wherein the resistors of the network are provided in series.

5. A signal sequencing control means according to claim 1 wherein said sequence of control signals is being operated via at least one logic gate.

6. A signal sequencing control means according to claim 5 wherein at least one of said logic gate is a Schmidt Logic Gate.

7. A signal sequencing control means according to claim 1 wherein the circuit path includes at least one logic gate and voltage is driven by at least one of said gates along a circuit path through a series of resistors in a first direction via a diode at the start of the resistor path, and a reverse diode being provided at the end of the resistor path to drive a voltage through the resistors in the reverse direction.

8. A signal sequencing control means according to claim 1 wherein said sequence of signals in a forward direction is different to the sequence of signals in a reverse direction and the control signals in the forwards and reverse direction are driven using the same circuit path.

9. A signal sequencing control means according to claim 1 wherein said electronic device is a smart card.

10. A signal sequencing control means according to claim 9 wherein said smart card has at least three lines which need to be activated in a pre-determined order for operation of said device and deactivated in a reverse order for disabling said device.

11. A signal sequencing control means for a smart card interface, said interface comprising:
    an electronic circuit driven to generate the sequence of control signals in a forwards and reverse direction along a same circuit path; and
    timing means to allow a sequence of control signals to be activated in a pre-determined order for operation of the card and deactivated in a reverse order for disabling the card.

12. A smart card reading apparatus, said apparatus for reading/receiving and processing signals for a smart card, said reading apparatus comprising:
    an electronic circuit driven to generate the sequence of control signals in a forwards and reverse direction along a same circuit path; and
    a timing means to allow a sequence of control signals to be activated in a pre-determined order for operation of the card and deactivated in a reverse order for disabling the card.

* * * * *